United States Patent [19]

Dickhoff

[11] Patent Number: 5,438,888
[45] Date of Patent: Aug. 8, 1995

[54] DEVICE FOR COMPENSATING PITCH ERRORS IN WORM GEARS

[75] Inventor: Andreas Dickhoff, Kirchheim-Teck, Germany

[73] Assignee: Eastman Kodak Company, Rochester, N.Y.

[21] Appl. No.: 205,987

[22] Filed: Mar. 4, 1994

[30] Foreign Application Priority Data

Mar. 10, 1993 [DE] Germany .................. 43 07 529.0

[51] Int. Cl.⁶ .............................................. F16H 55/18
[52] U.S. Cl. ............................................ 74/459; 74/441
[58] Field of Search ............... 74/459, 441, 424.8 A, 74/445, 424.8 R, 89.15; 411/427, 437, 438

[56] References Cited

U.S. PATENT DOCUMENTS

| | | |
|---|---|---|
| 3,831,460 | 8/1974 | Linley, Jr. ............... 74/459 |
| 5,094,119 | 3/1992 | Virga et al. ............ 74/459 |

FOREIGN PATENT DOCUMENTS 752459  7/1956  United Kingdom ............. 74/441

*Primary Examiner*—Charles A. Marmor
*Assistant Examiner*—Troy Grabow
*Attorney, Agent, or Firm*—David M. Woods

[57] ABSTRACT

A device for compensating pitch errors in a worm gear consists of a stationarily mounted rotary worm-gear spindle (11) and a nut element (24) which is axially movable on said spindle and connected with an object to be translatorily moved. The object may be a support (14) for an image document, a slide or the like which is scanned in a scanner for enhancing data for electronic processing. The device is characterized in that the nut element (24) is composed of a plurality of resilient disks (17) accommodated in a transport sleeve (13) and each having a radial segment-shaped slot (18), in that the disks engage the threads (20) of the spindle by means of end faces (21) defined by the slots and in that the outer circumferential surfaces of the disks are fixedly connected with the transport sleeve. This allows the support (14) to be moved with great precision and the electronic data of the image document to be enhanced as correctly as possible.

7 Claims, 3 Drawing Sheets

DEVICE FOR COMPENSATING PITCH ERRORS IN WORM GEARS

FIELD OF INVENTION

The invention relates to a device for compensating pitch errors in a worm gear comprising a stationarily mounted rotary worm-gear spindle and a nut member axially movable on said worm-gear spindle and connected with an object which is to be translatorily moved.

BACKGROUND OF THE INVENTION

The play caused by manufacturing tolerances between a worm-gear spindle and the internal thread of a nut, which manifests itself as so-called lost motion, is unacceptable for certain applications, e.g., in measuring systems, fine-adjustment apparatus and scanner units. In such high precision systems, it is essential that the transmission of motion between spindle and nut should be free from play.

German Patent 36 42 463 discloses a device for axially adjusting free from play mounting arrangements using a pair of adjustment rings. By means of two or more complementary concentric pitch surfaces these adjustment rings rest on each other with a pitch angle in the automatic locking range and change their axial extension by rotation relative to each other. Each pair of adjustment rings features two or more pairs of pitch surfaces radially nested into each other and extending over an angle of 360 degrees, said surfaces being angularly offset with respect to the beginning and end of their pitch. The size of the offset angle is inversely proportional to the number of pairs of pitch surfaces.

These known adjustment rings are of a complex design and thus difficult to manufacture if the precision required of a worm gear of the aforementioned type is to be ensured. They are not suitable for the manufacture of large production series involving broad tolerances, which increases their manufacturing costs significantly.

SUMMARY OF THE INVENTION

It is the object of the invention to provide a device for preventing play and compensating pitch errors in worm gears of the above type, which device is to be of an uncomplicated design, inexpensive to manufacture and to operate reliably and with high precision.

According to the invention this object is attained in that the nut element consists of a plurality of resilient disks accommodated in a transport sleeve and each having a radial segment-shaped slot, in that said disks engage the threads by means of end faces of adjacent disks as defined by the slots and in that the outer circumferential surfaces of said disks are fixedly connected with said transport sleeve.

Using this uncomplicated arrangement according to the invention pitch errors caused by manufacture in moving worm gears, and in particular periodic pitch errors occurring during short transport travels, are considerably reduced. Owing to the resiliency of the thin individual disks, the axial distance between adjacent disks and the fixing of the outer circumferential disk surfaces in the transport sleeve, a great number of contact points between nut element and worm-gear spindle is obtained, which results in a compensation effect by which the pitch errors are eliminated.

Moreover each disk is provided with notches uniformly distributed over its circumference and extending substantially axially one behind the other when the disks are seated on the spindle while the transport sleeve has at least one recess associated with said notches. In order to fix the disks in the transport sleeve a hardenable binder is filled into the recess and the notches.

Further advantages and features can be inferred from the description of an embodiment of the invention illustrated in the drawing as well as from the further subclaims.

BRIEF DESCRIPTION OF THE DRAWINGS

The drawing shows in

DESCRIPTION OF THE PREFERRED EMBODIMENTS

Figure 1:
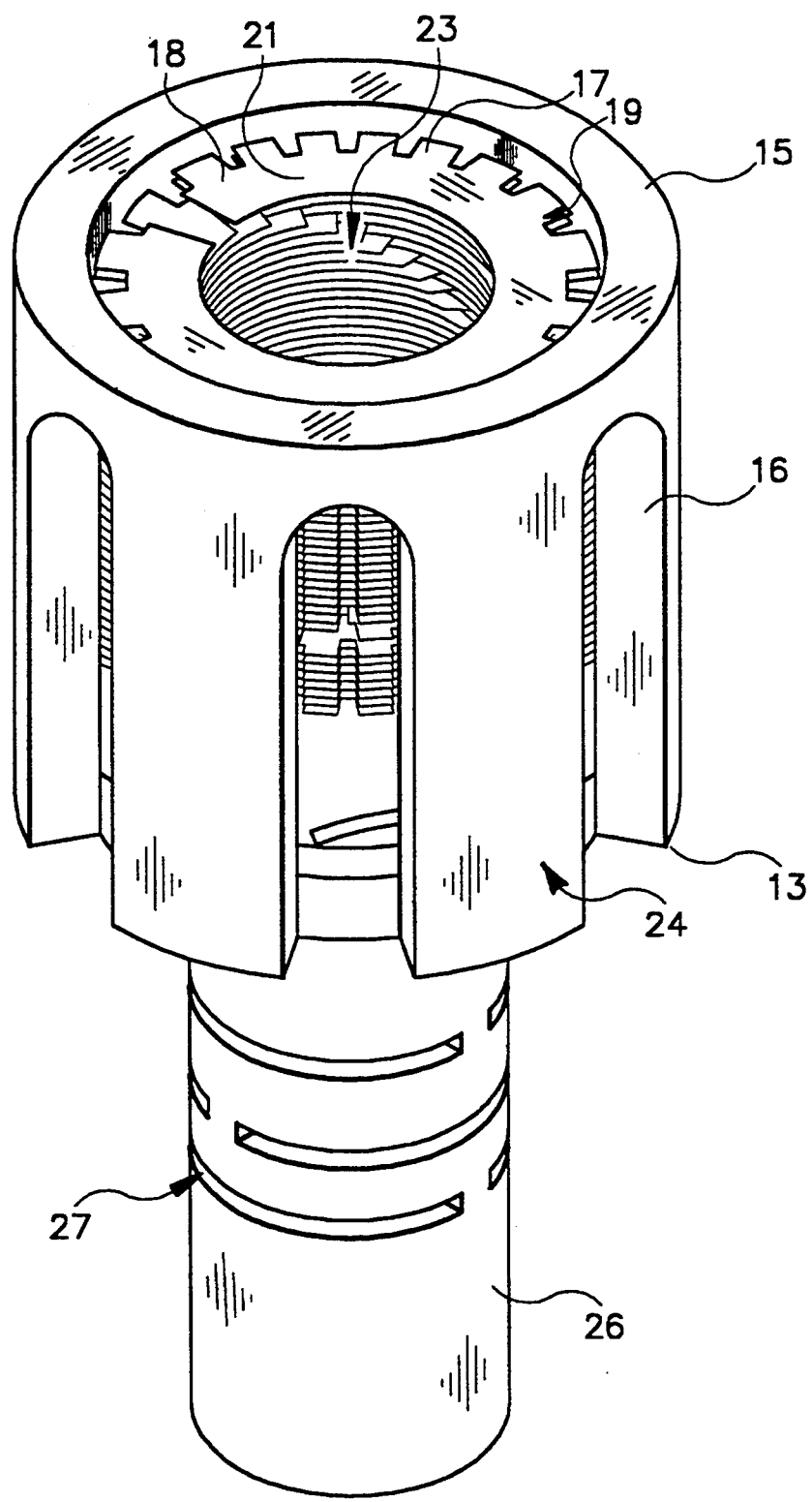
FIG. 1 a perspective view of the device according to the invention.
Figure 2:
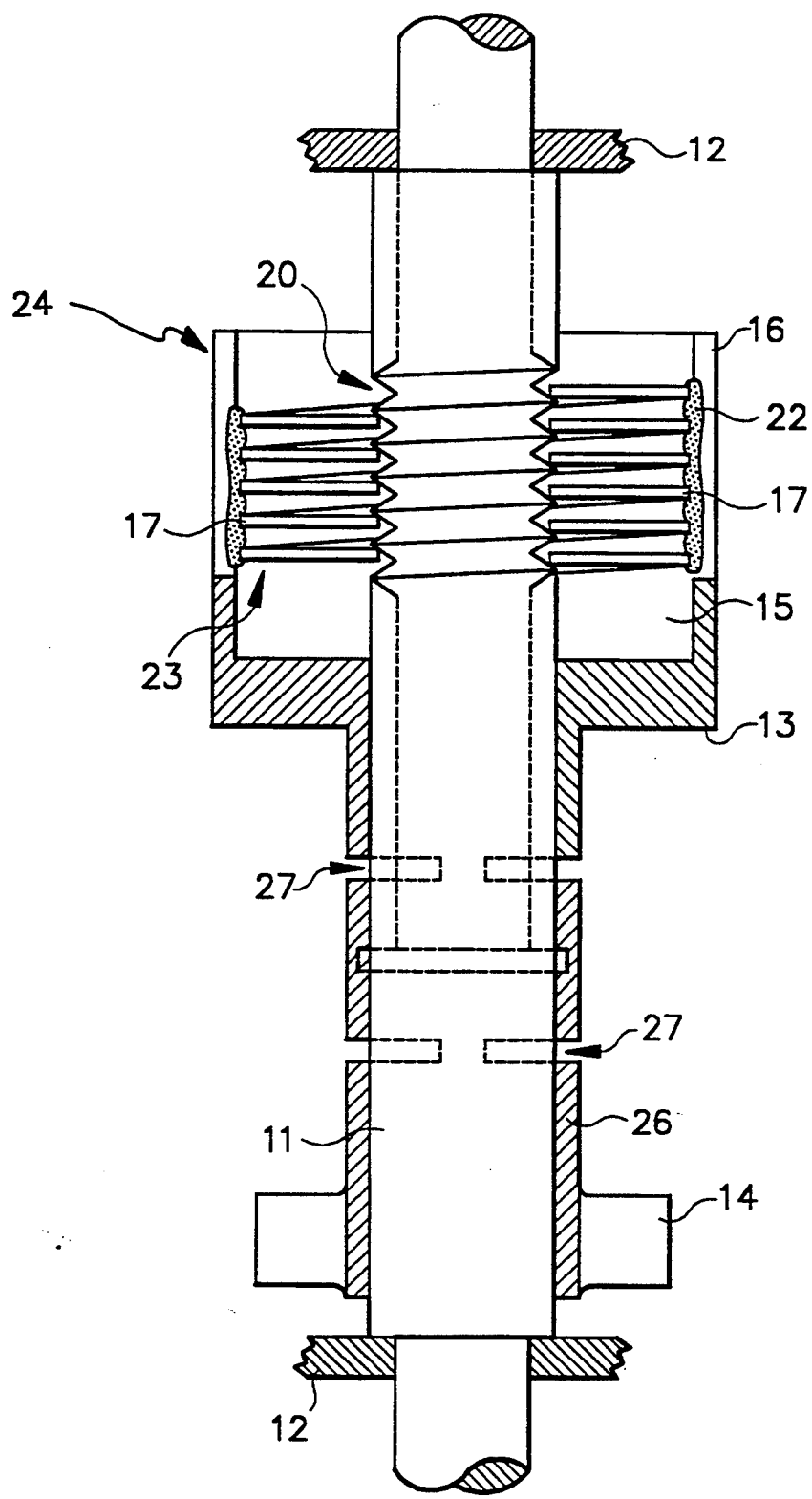
FIG. 2 an enlarged sectional view of the device according to the invention.
Figure 3:
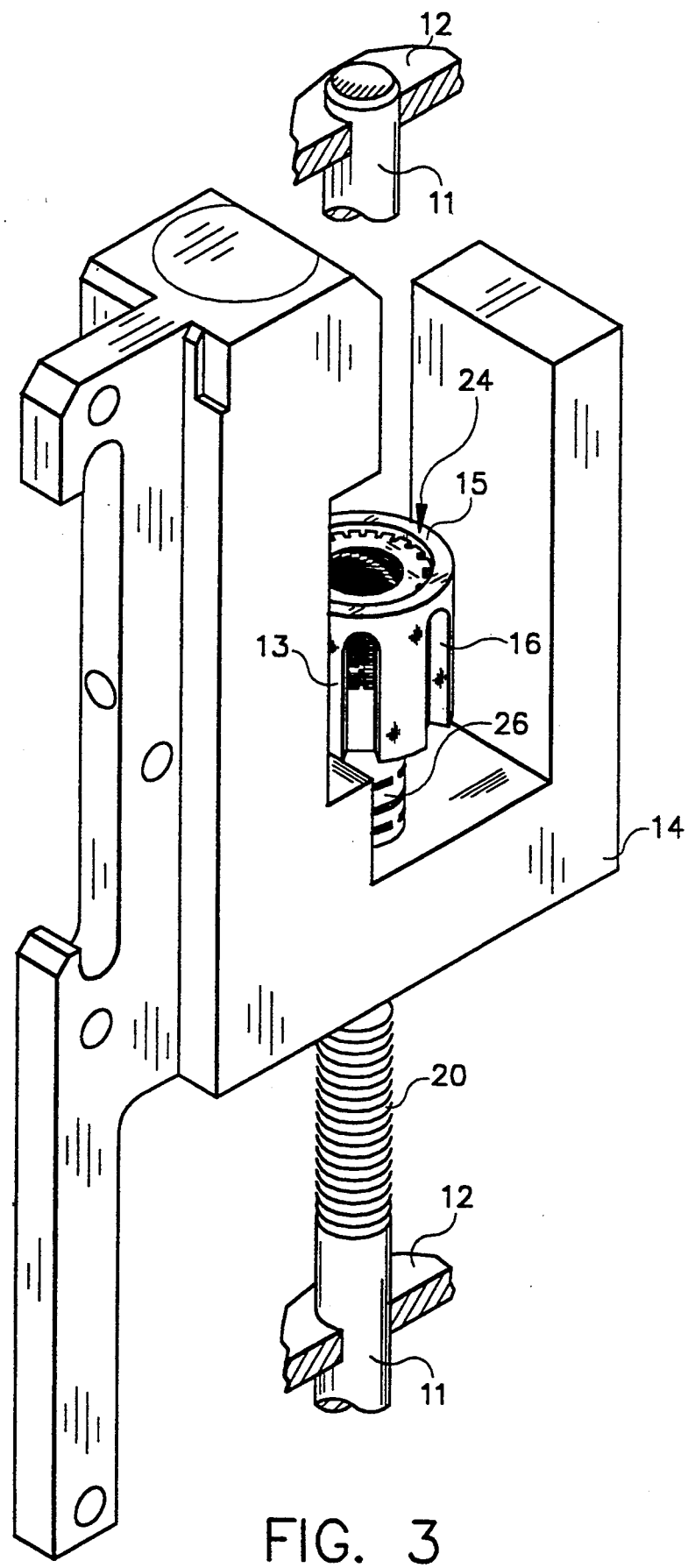
FIG. 3 a perspective view of the device according to FIG. 1 when built into a translatorily movable object.

The device for compensating pitch errors in moving worm gears as illustrated in the drawing is usable for, among other things, scanner systems for the scanning of image documents, slides or the like. The device allows the documents to be transported with extreme precision so that the image data can be scanned free from errors.

As shown in the drawings, the device consists of a worm-gear spindle 11 which is mounted for rotation and axially fixed in mounting means 12 stationarily provided in a housing. A transport sleeve 13 loosely rotatable on worm-gear spindle 11 is provided at one end with an object designed as a support 14 which may serve to support an image document, a slide or the like.

The other end of transport sleeve 13 is widened to form a barrel 15 extending coaxially with the worm-gear spindle 11 and having in its circumferential surface axially disposed recesses 16. In order to fix the disks 17 in transport sleeve 13, a hardenable binder 22 is used to fill the recesses 16 of barrel 15 as well as the notches 19 provided in the disks 17.

Instead of the recesses, elevations can also be provided on the inner circumferential surface of barrel 15, such elevations engaging the notches free from play.

The interior of barrel 15 of transport sleeve 13 houses resilient disks 17 which are each provided with a radial and segment-shaped slot 18 interrupting the annular disk shape and defining an angle as well as with notches 19 distributed over their outer circumference, as can be seen in FIG. 1. The internal diameters of the disks are smaller than the external diameter of the worm-gear spindle so that the disks 17 are adapted to engage the threads 20 of the worm-gear spindle.

The total number of disks 17 seated on worm-gear spindle 11 results in a package, with the end face 21 of each disk 17 resting against the end face of its adjacent disk 17.

In detail the invention is such that the slot 18 of each disk 17 encloses a circumferential angle α which is formed as a function of the total number of disks used and obtained by following equation:

$$\alpha = 360°/M$$

where

M = the number of disks used.

Assuming an angle of the radial segment-shaped slot 18 of 18 degrees, 360/18=20 disks resting against each other with their end faces 21 form a nut-thread package having 19 threads.

Assuming each of the twenty disks 17 contacts a thread of the worm-gear spindle at two points only the nut-thread package rests against the worm-gear spindle 11 at at least forty points. If the disks 17 have a thickness of, for example, 0.1 mm and the worm-gear spindle 11 has a pitch of 0.35 mm the resiliency of the individual disks 17 and the spacing of the disks 17 result in that the nut-thread package engages the worm-gear spindle 17 free from play.

Since the disks 17 are fixed in transport sleeve 13 the aforementioned advantages are reached. In order to obtain an effective engagement the notches are arranged such that they extend approximately axially in the direction of the recesses when the nut-thread package 23 is seated on worm-gear spindle 11.

The nut-thread package 23 and the transport sleeve 13 together form the actual nut element 24 which is connected with the support 14 for an image document, slide or the like which is to be scanned. To produce the nut-thread package 23 the disks 17 are successively rotated onto the worm-gear spindle 11 until they rest against each other with the slot-end faces 21 pointing towards each other whereupon transport sleeve 13 is shifted over the disks 17 and binder 22 filled into the recesses 16 and the notches 19.

In order to ensure that the worm-gear spindle 11 can be rotated without jamming, transport sleeve 13 is provided with a sleeve-shaped shaft including a plurality of axially spaced slots 27 which are offset by 90 degrees. These slots 27 permit a resilient deflecting and compensation movement between the worm-gear spindle 11 and the transport sleeve 13 so that a smooth and precise motion of the device is ensured.

What is claimed is:

1. Device for compensating pitch errors in a worm gear comprising a stationarily mounted rotary worm-gear spindle (11) and a nut element (24) axially movable on said worm-gear spindle (11) and connected with an object to be translatorily moved, characterized in that the nut element (24) comprises of a plurality of resilient disks (17) accommodated in a transport sleeve (13) and each disk having a radial segment-shaped slot (18) extending through the disk, in that said disks engage the threads (20) on the outside surface of the worm gear spindle by means of end faces (21) of adjacent disks as defined by said slots and in that the outer circumferential surfaces of said disks are fixedly connected with said transport sleeve.

2. Device according to claim 1, characterized in that adjacent disks are spaced from each other on the worm-gear spindle (11).

3. Device according to claim 1, characterized in that the thickness of the disks (17) is smaller than the pitch of the worm-gear spindle.

4. Device according to claim 1, characterized in that the segment-shaped slot (18) of each disk (17) defines a circumferential angle $\alpha$ which is formed as a function of the total number of disks used and obtained by the equation $$\alpha = 360°/M$$

wherein
M = the number of disks used.

5. Device according to claim 1, characterized in that each disk (17) has notches (19) distributed about its outer circumference and the transport sleeve (13) includes in the area of said notches at least one recess (16) and in that said recess and said notches are filled by a hardenable binder (22).

6. Device according to claim 1 characterized in that in an axial extension of the transport sleeve (13), which accommodates the disks (17), said transport sleeve comprises a sleeve-type shaft (26) enclosing the worm-gear spindle (11) and including in the axial direction a plurality of pairs of radially opposed slots (27), each pair offset from the adjacent pair by 90 degrees.

7. Device according to claim 6, characterized in that the object to be moved by a translatory motion is connected with the free end of the sleeve-type shaft (26).

* * * * *